Feb. 23, 1965  G. A. KIRK  3,171,075
SERVO SYSTEM FOR TWO PHASE MOTORS
Filed Sept. 1, 1960  6 Sheets-Sheet 1
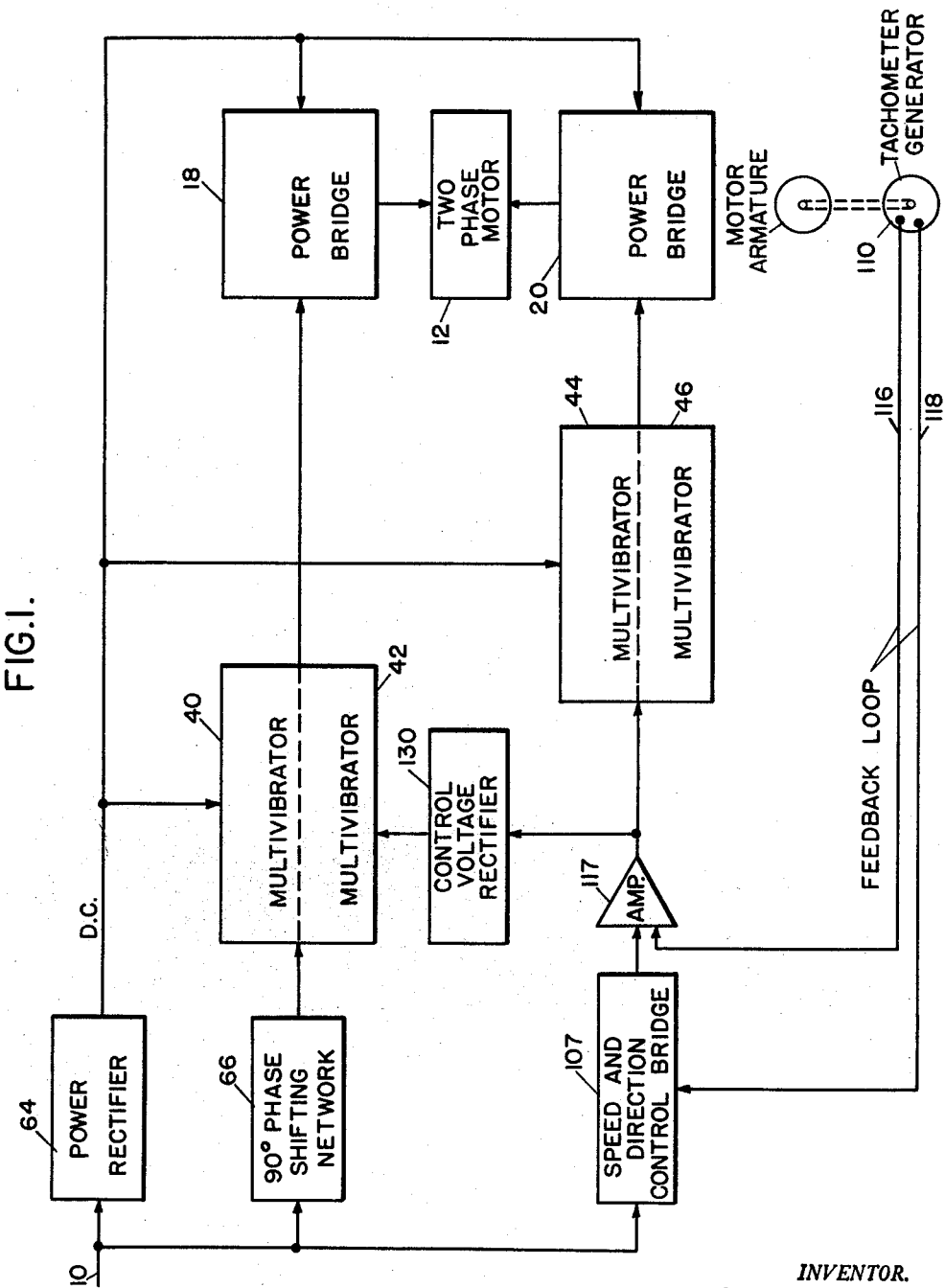
FIG.I.
INVENTOR.
G. A. KIRK
BY
HIS ATTORNEY

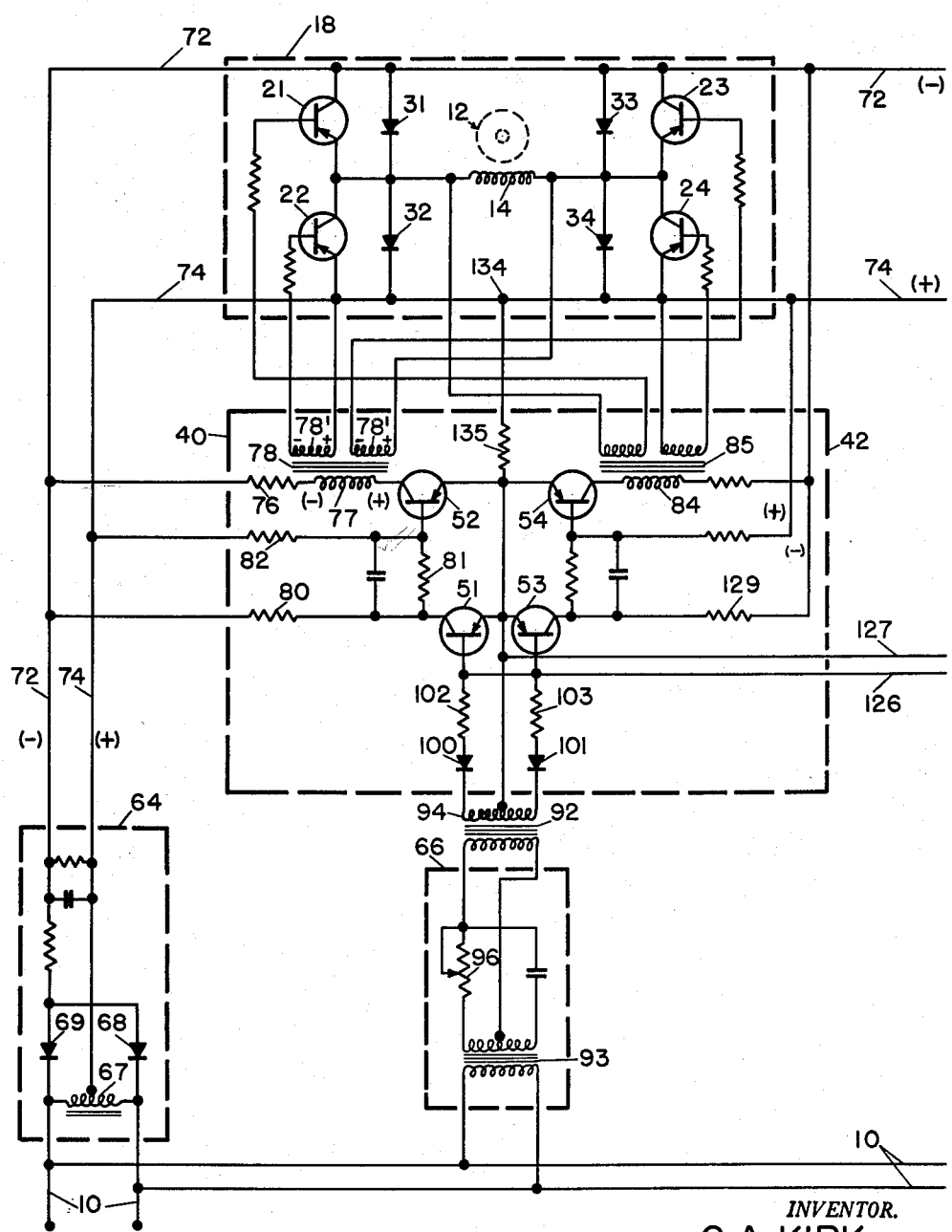

INVENTOR.
G. A. KIRK
HIS ATTORNEY

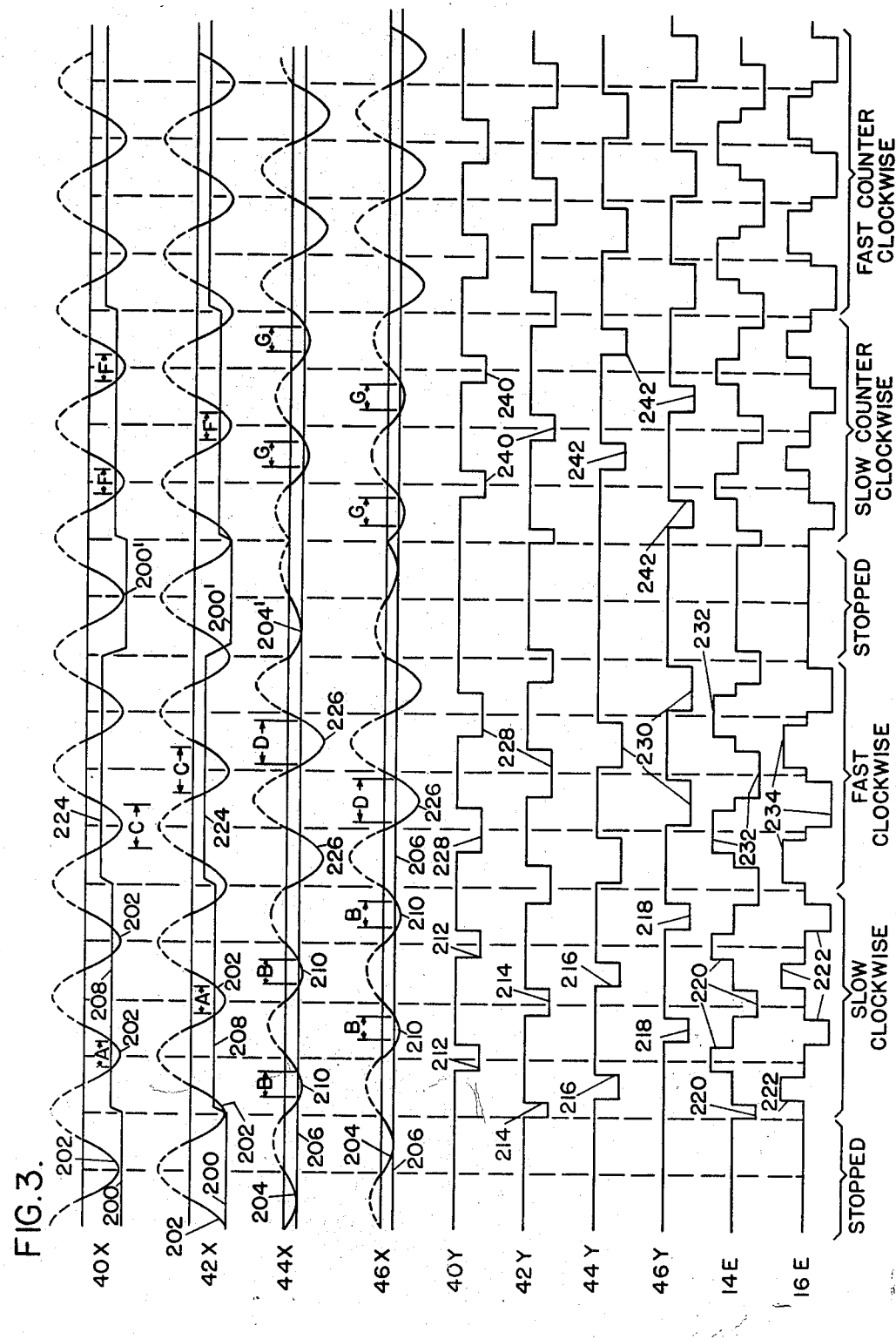

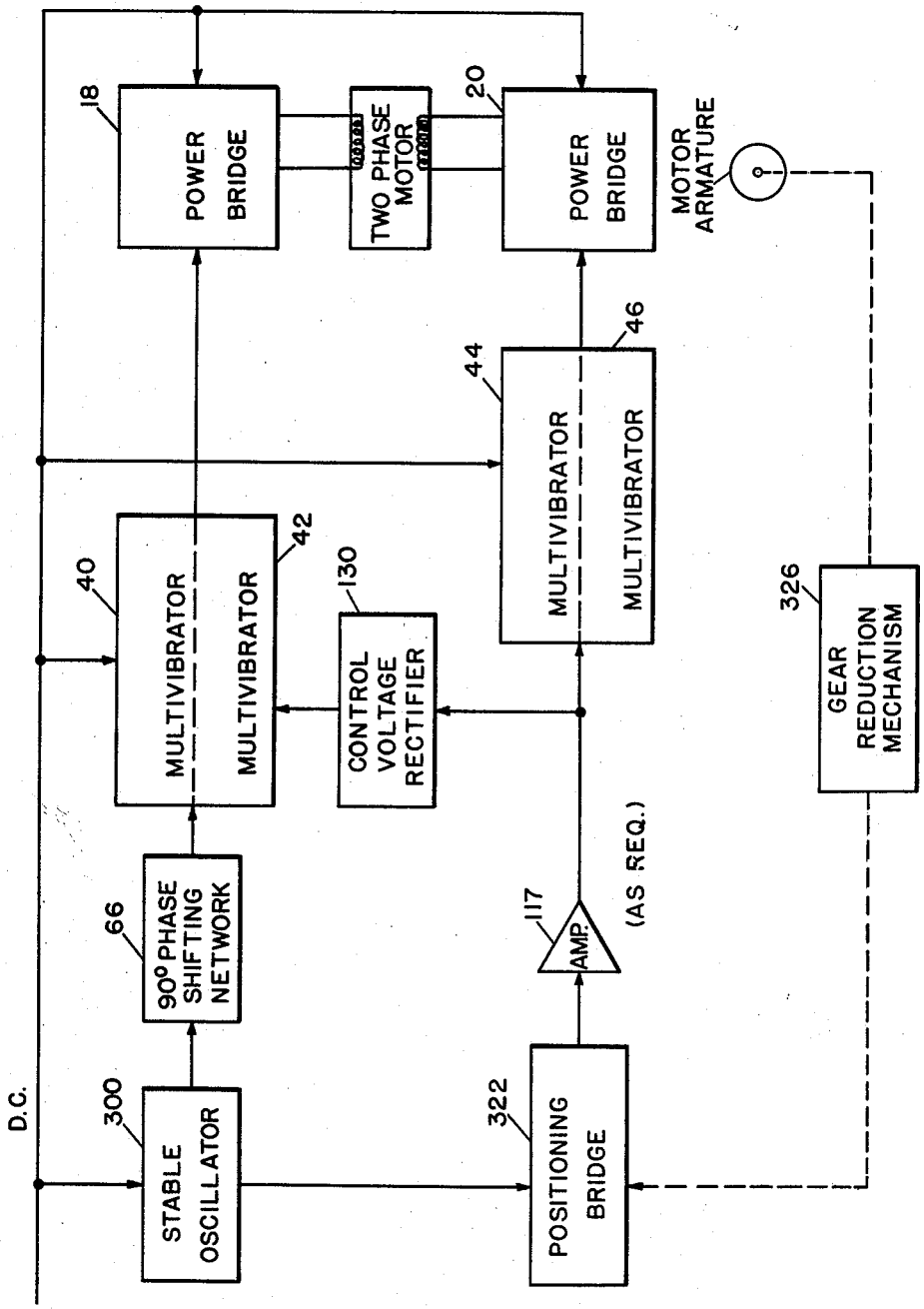

Feb. 23, 1965   G. A. KIRK   3,171,075
SERVO SYSTEM FOR TWO PHASE MOTORS
Filed Sept. 1, 1960   6 Sheets-Sheet 6

INVENTOR.
G. A. KIRK
BY
HIS ATTORNEY

United States Patent Office 3,171,075
Patented Feb. 23, 1965

3,171,075
SERVO SYSTEM FOR TWO PHASE MOTORS
George A. Kirk, Teaneck, N.J., assignor to General Signal Corporation, a corporation of New York
Filed Sept. 1, 1960, Ser. No. 53,389
17 Claims. (Cl. 318—341)

The present invention relates to a motor control system, and more particularly to a system for controlling the operation of a two phase motor. Specifically, the present invention relates to a servo system adapted to control the direction and speed, or the position of a two phase alternating current induction motor.

Heretofore, various systems have been proposed for controlling the speed, the direction of rotation, and the angular position of two phase motors. It was common practice in some of these systems to exercise control over one of the windings of the motor, while the power in the other winding remained constant. This not only decreased the efficiency of the motor while it was running, but permitted the motor to continue rotation after being controlled to stop. In positioning systems with this type of control particularly, excessive heating of the motor occurred when the motor was in its normal or controlled position of correspondence. Moreover, in some systems for the bi-directional control of two phase motors, it was necessary to provide a specially wound motor which was bulky, complicated and expensive.

One of the objects of the present invention is to provide an improved servo system for controlling the operation of a two phase motor.

Another object of this invention is to provide a system for controlling the operation of a motor from a single phase power source.

Another object of this invention is to provide a system which permits a full range of bi-directional control over a two phase motor that has only two windings which are 90° out of phase relative to one another.

Another object of this invention is to provide a system for controlling a two phase motor wherein the power to the two phase windings of the motor is controlled simultaneously.

Still another object of this invention is to provide a system which is effective to exercise its control over a two phase motor within one-half cycle of the operating frequency.

A further object of this invention is to provide a servo system for a two phase motor that has but two windings which are 90° out of phase relative to one another and which is effective to control both phases of the motor simultaneously for bi-directional control over the full range of speed of the motor.

A further object of this invention is to provide a servo system for a two phase motor that is operative from a single phase source wherein the energy is supplied to each winding of the motor simultaneously through a power bridge.

A still further object of this invention is to provide a servo system of the character described wherein square wave pulses are provided to energize both windings of the motor and the speed control of the motor is accomplished by a variable control signal which modulates the width of these square wave pulses.

A still further object of this invention is to provide a servo system of the character described which uses a pair of astable multivibrator circuits for producing the square wave pulses for rendering effective each power rectifying bridge to control its respective motor winding, and the feedback or control signal is a variable direct current bias for one pair of multivibrators and a sine wave voltage of varying amplitude for the other pair of multivibrators.

A still further object of this invention is to provide a system of the character described which is easily adapted to provide control for a two phase motor regardless of its operation frequency from a standard commercial single phase alternating current supply source.

A still further object of this invention is to provide a servo system of the character described which may be easily adapted to control the angular position of a two phase motor as well as controlling the speed and direction of the motor.

A still further object of this invention is to provide a system of the character described which uses a minimum of components, is versatile in its application, and is reliable and efficient in its performance.

Other objects of this invention will become apparent from the specification, the drawings, and the appended claims.

In the drawings:

FIG. 1 is a diagram of the various components and their relationship in a system constructed according to one embodiment of this invention for controlling the speed and direction of rotation of a two phase motor.

FIGS. 2A and 2B, when placed side by side, is a typical circuit of one embodiment of the system for controlling the speed and direction of the motor;

FIG. 3 is a diagram illustrating typical voltage wave forms and their relative phases at various points in the system and in the motor windings for various speeds and opposite directions of the motor;

FIG. 4 is a diagram of the various components and their relation in a system constructed according to another embodiment of this invention.

Figure 2B:
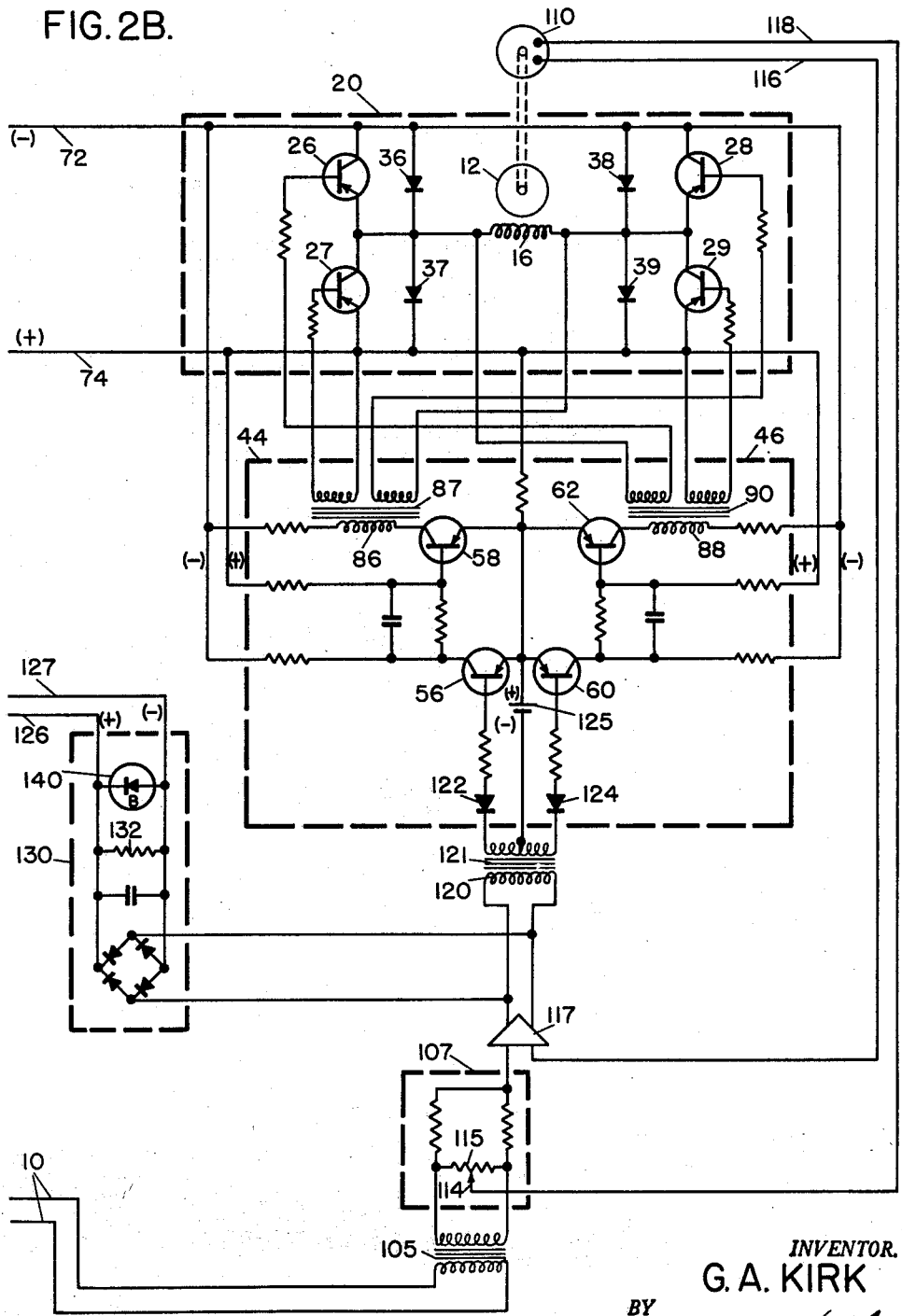

In the embodiments of the invention illustrated, an alternating current induction motor which is to be controlled has two windings which are 90° out of phase relative to one another. Each winding is connected across the output of a respective power bridge, and each bridge includes two pair of solid state switching devices. The switching devices in each power bridge are preferably transistors which are so connected that each pair of switching transistors conduct during alternate half cycles to permit current to flow in the bridge for energizing its associated motor winding with full wave alternating current. The length of time that these transistors are conductive during each half cycle determines the average current flowing in tis associated motor winding to control the speed of the motor. Each power bridge is connected to the output of a pair of astable multivibrators which control the phase and period of conduction of the transistors. The astable multivibrators used in this system are of the type which are capable of providing square wave output pulses to trigger the switching transistors in their associated bridge circuits.

The relative phases of the output of the multivibrators is controlled by a source of single phase alternating current. One pair of the multivibrators receives this single phase alternating current through a 90° phase shifting network so that one pair of multivibrators is capable of producing square wave pulses which are 90° out of phase with respect to the other pair of multivibrators. The width of the output pulses of the multivibrators is controlled by a signal or control voltage, the amplitude of which, controls the speed of the motor or its angular position. The amplitude of the signal voltage may be regulated by a device mechanically operated by the motor armature. The signal voltage from the output of the mechanical device is 90° out of phase with one multivibrator and is either in phase or 180° out of phase with the other multivibrator. The signal voltage for the multivibrator that is 90° out of phase is rectified to provide a signal input to this multivibrator which is a direct voltage bias, the level of which varies according to the speed or angular position of the motor. The signal voltage of other multivibrator which is in phase with its control voltage, and in phase or 180° out of phase with the supply line is of variable amplitude depending upon the speed or position of the motor. The direction of rotation of the motor is controlled by the phase of the alternating signal voltage to this other multivibrator which causes the phase of this multivibrator to lead or lag the phase of the other multivibrator by 90°.

Referring in detail to the drawings by numerals of reference, and particularly to FIGS. 1, 2A and 2B, 10 denotes a source of alternating single phase power which may be commercially available 60 cycle current for operating a standard two phase induction motor 12 which is constructed to be operated from A.C. voltage of a similar frequency. The motor 12 has two windings 14 and 16 respectively which are 90° out of phase. Each of the windings 14 and 16 is connected across the output of respective power bridge circuits 18 and 20. The power bridge circuit 18 includes four switching transistors 21, 22, 23 and 24 which control the flow of current through the motor winding 14. Transistors 22 and 23 when conducting cause current to flow in one direction during one-half cycle through the winding 14, and transistors 21 and 24 when conducting cause current to flow in the opposite direction through the winding 14 in the next half cycle. The bridge 20 includes switching transistors 26, 27, 28 and 29 for controlling the flow of current through the winding 16 of the motor. The conduction of transistors 26 and 29 causes current to flow through the winding 16 in one direction during one-half cycle, and transistors 27 and 28 cause current to flow in the other direction through the winding 16 during the next half cycle. Thus, one pair of the transistors in each power bridge circuit 18 and 20 are so gated to simultaneously permit current to flow through the motor winding in one direction during a half-cycle period, and the other pair of transistors in each bridge circuit permit current to flow in the other direction through the respective winding in the next half cycle. The power bridge 18 also has four diodes 31, 32, 33 and 34 each of which is connected across the emitter and collector of a respective transistor 21 through 24 to permit rapid switching of the transistors by allowing a return path for the back E.M.F. in the motor winding 14. Also, in the power bridge 20, diodes 36, 37, 38 and 39 are connected across the emitter and collector of each of the transistors 26 through 29, respectively, to provide a return path for the back E.M.F. in winding 16 of the motor.

A pair of astable multivibrators 40 and 42 are provided to control the periods of conduction of opposite pairs of the transistors 21 through 24 in the power bridge 18 to energize the winding 14 of the motor 12; and a similar pair of multivibrators 44 and 46 are provided to control the periods of conduction of opposite pairs of the transistors 26 through 29 in the power bridge 20 for the winding 16.

The astable multivibrators 40, 42, 44 and 46 are of the type wherein the output waveform is a so called square wave regardless of the shape of the input voltage waveform. The amplitude of the output pulses is also independent of the amplitude of the input, and the amplitude of the input pulses affects only the width of the square wave output pulses. In the illustrated embodiments of the invention, an astable emitter coupled multivibrator commonly known as a Schmitt trigger circuit was found satisfactory because the time interval for switching the transistors from cut off to saturation is extremely short, such as 25 microseconds for a 2N277 type transistor, for example. This reduces the junction heating of the transistors in the power bridge circuits 18 and 20 while switching large amounts of power through the class A region of the transistors.

Each astable multivibrator or Schmitt trigger circuit 40, 42, 44 and 46 is capable of producing square output pulses in the negative going half of each cycle only, or in other words half wave pulses, therefore it is necessary to provide two of these circuits for controlling the conduction of full wave current through each power bridge circuit 18 and 20.

Each Schmitt trigger circuit is provided with a pair of transistors which are so connected in a manner well known in the art that when one transistor is conducting, the other one is non-conducting; and when the amplitude of the input reaches the bias level of the transistors, the nonconducting transistor conducts which regeneratively turns off the other transistor. This alternate conducting and nonconducting produces the square wave output pulses. Transistors 51 and 52 are provided for the trigger circuit 40. The trigger circuit 42 is provided with transistors 53 and 54; the trigger circuit 44 includes transistors 56 and 58, and the circuit 46 includes transistors 60 and 62.

The single phase alternating current source 10 provides the energy for operating the two phase motor 12 according to the embodiment of the invention illustrated in FIGS. 1, 2A and 2B. In this system the A.C. current is rectified by a full wave power rectifier 64, and is also shifted 90° out of phase by a conventional phase shifting network 66.

The power rectifier 64 includes a coil 67 which acts as a surge limiting inductor, and is so connected to provide the necessary center tap return for the full wave output circuit from the rectifiers. The rectifier 64 has diodes 68 and 69 which are solid state, but it is understood that vacuum or gas tubes may be substituted therefor.

In the output circuit of the power rectifier 64, wire 72 is negative, and wire 74 is positive. The wire 72 supplies a negative potential to the collector junction of the transistor 21 through 24 and transistor 26 through 29 in the bridge circuits 18 and 20 respectively. The wire 74 provides a positive potential to the emitter junction of each of these transistors in the bridge circuits 18 and 20 respectively.

The collector-emitter potential for transistor 52 in the trigger circuit 40 is supplied from the output of the rectifier 64. The circuit which supplies this potential extends from the negative conductor 72 and includes resistor 76, primary coil 77 of transformer 78, the collector and emitter of transistor 52, and resistor 135 to the positive conductor 74. A potential is similarly applied across the emitter-collector terminals of the transistors 54, 58 and 62 by obvious circuits connected across the output of rectifier 64. The emitter-collector potential circuit for transistor 54 includes primary winding 84 of output transformer 85; this circuit for transistor 58 includes the primary winding 86 of output transformer 87, and the primary winding 88 of output transformer 90 is included in the emitter collector circuit for transistor 62. Also, a collector-emitter potential is applied to each of the transistors 51, 53, 56 and 60 from the output of the rectifier 64. For example, the potential across the collector-emitter terminals for transistor 51 in trigger 40 originates at negative bus 72 and includes resistor 80, the collector and emitter terminals of transistor 51, and resistor 135 to the positive bus 74.

The resistor 80 is in trigger circuit 40 common with a voltage dividing-network which includes resistors 81 and 82. The junction point of resistors 81 and 82 provide the proper potential to the base of transistor 52 to hold the transistor 52 in a normal conductive state. The transistors 54, 58 and 62 are also held in a normal state of conduction by identical circuitry as is obvious in FIGS. 2A and 2B.

The phase shifting network 66 is provided to control the trigger circuits 40 and 42 so that the switching transistors in the bridge circuit 18 that controls motor winding 14 will cause current to conduct 90° out of phase with respect to the current from the switching transistors in the bridge circuit 20 that control the winding 16 of the motor. Variable resistor 96 is permanently adjusted so that the phase of the output sine wave voltage across the primary of transformer 92 is exactly 90° displaced from the phase of the voltage across the input to transformer 93 of the network 66. Only the negative going pulses which are induced in the secondary winding 94 of transformer 92, are conducted through resistors 102 and 103, respectively, to the base of transistors 51 and 53, because of the diodes 100 and 101, which are connected to opposite ends of the secondary coil 94.

The alternating current source 10 is also fed by transformer 105 directly to a resistance bridge 107 which for the embodiment shown in FIGS. 1 and 2B is a speed and direction control bridge. Also connected to the resistance bridge 107 is the output from a tachometer generator or drag cup generator 110.

The generator 110 which may be operatively connected to the motor armature 12, provides an alternating current output the amplitude of which corresponds to the speed of the motor, and which output subtracts in a well known manner from the alternating line current in the bridge circuit 107. Thus, when the motor slows down to cause a sine wave of less amplitude across output wires 116 and 118 of the generator 110 the amplitude of the sine wave across primary winding 120 of transformer 121 is increased. If the motor should speed up thus increasing the amplitude of the sine wave from the output of the generator 110 the resulting sine wave across the transformer 121 will decrease.

The adjustment of movable arm 114 on the resistor 115 in the bridge 107 determines the controlled direction and speed of the motor 12. Thus, if the arm 114 is on center the motor will be controlled to stop; if the arm 114 is off center to one side of the resistor 115, the resulting sine wave or difference voltage will be in phase with the line voltage 10 to control the motor 12 in a clockwise direction, for example, and if the arm is off center in the other direction, the difference voltage is 180° out of phase with the line voltage to control the motor in the opposite direction. This difference voltage from the bridge 107 may be amplified by an amplifier 117 before it is induced in the secondary winding 120 of a transformer 121 in the input of the trigger circuits 44 and 46. Similar to the alternating current input to trigger circuits 40 and 42, diodes 122 and 124 permit negative going pulses only to be applied to the bases of transistors 56 and 60 in trigger circuits 44 and 46.

Thus, at this point it is seen that the alternating voltage to the input of the trigger circuits 40 and 42 is of constant amplitude and phase, and the alternating voltage to the input of the trigger circuits 44 and 46 is of varying amplitude, and either in phase or 180° out of phase with the single phase voltage from the line source, and the phase of the alternating voltage in trigger circuits 44 and 46 either leads or lags the phase in trigger circuits 40 and 42 by 90°, regardless of the amplitude.

In the trigger circuits 44 and 46 which have alternating voltage of varying amplitude and 180° phase reversal, the bases of transistor 56 and 60 are provided with a fixed direct current bias voltage such as is denoted at 125. This bias voltage is negative and at a very low level with respect to the zero level of the alternating voltage pulses applied to the bases of transistors 56 and 60.

In the trigger circuits 40 and 42 which have an alternating current input of fixed amplitude and phase, the bases of transistors 51 and 53 are provided with a bias which is more negative than the negative going pulses applied to the bases of transistors 51 and 53.

The bias for transistor 51 is provided by a circuit which extends from junction 134 on the positive bus 74 and includes resistor 135, wire 127, a load resistor 132, wire 126, the base to collector junction of the transistor 51 and resistor 80 to the negative bus 72. The bias for transistor 53 extends from positive bus 74 and includes resistor 135, wire 127, resistor 132, wire 126, the base to collector junction of transistor 53, and resistor 129 to the negative bus 72. A full wave rectifier 130 is connected across the output of amplifier 117 and the wires 126 and 127 in the biasing circuit for the transistors 51 and 53. When there is no input to the voltage rectifier 130, from amplifier 117 the bases of the transistors 51 and 53 have a negative bias at a level below the peak of the alternating input from transformer 92. Because the input to the rectifier 130 is of varying amplitude, the output is a direct current of varying level. The polarity of this voltage across lines 126 and 127 is such to oppose and decrease the normal negative bias to the bases of the transistors 51 and 53 to drive the bias toward zero as the direct current output from the rectifier 130 increases. Thus, the actual D.C. voltage bias level in trigger circuits 40 and 42 depends on the amplitude of the difference voltage from the amplifier 117. Zener diode 140 in the control voltage rectifier 130 protects the system against reverse voltage surges.

Therefore, it is apparent that the trigger circuits 40 and 42 which have a fixed A.C. voltage input are provided with a variable bias level, and the trigger circuits 44 and 46 which have a variable A.C. voltage input are provided with a fixed bias level. Also, when the A.C. voltage output or difference voltage of the amplifier 117 is at maximum amplitude for the system, the negative bias in trigger circuits 40 and 42 is close to zero and at substantially the same bias level as the fixed negative bias for transistors 56 and 60 in trigger circuits 44 and 46. The fixed negative bias for trigger circuits 44 and 46 is close to zero to provide full speed control.

The operation of the system will be described with reference to FIG. 3 wherein the waveforms are numbered to correspond with its associated trigger circuit and motor winding. Waveforms 40X, 42X, 44X and 46X represent the A.C. voltage and the direct current bias voltages in the corresponding numbered trigger circuits. Waveforms 40Y, 42Y, 44Y and 46Y represent the output pulses from the corresponding numbered trigger circuits. Waveforms 14E and 16E represent the voltage across the corresponding numbered motor windings.

Assuming that the motor is controlled to stop by the adjustment of arm 114 of resistor 115 in the speed and direction control bridge 107, and thus no output alternating voltage from the amplifier 117, the trigger circuits 40 and 42 are not conducting because the variable control D.C. bias level denoted at 200 is below the peak 202 of the fixed alternating current input waveform. Also trigger circuits 44 and 46 are not conducting because there is little or no alternating current the slight waveform being denoted at 204, and none of the peaks reach the fixed bias level which is denoted at 206. Thus, when the motor 12 is stopped, both windings 14 and 16 are deenergized because there is no output from the trigger circuits 40, 42, 44 and 46 and thus power bridges 18 and 19 are not conducting.

When the motor 12 is to be controlled at a slow speed in a clockwise direction (such as is designated in FIG. 3), for example, the arm 114 is moved a predetermined distance in one direction from the center point of the resistor 115 which applies an A.C. voltage to the amplifier 117, which is added algebraically to the A.C. voltage output from the tachometer generator 110. As shown in FIG. 3, the bias level 208 in trigger circuits 40X and 42X are above the negative peak values 202, and the peak negative values 210 in trigger circuits 44X and 46X have been increased so that they are below the fixed bias level 206. Since the alternating current is a sine wave in all the trigger circuits, the amplitude of the alternating current intersects the bias level in every instance at two spaced points which are of equal length for a designated speed. Thus, it is apparent from FIG. 3 that the distance denoted at A in the waveform of trigger circuits 40 and 42 is equal to the distance denoted at B in trigger circuits 44 and 46. It is during the time intervals that are denoted at A and B, respectively, that the trigger circuits 40, 42, 44 and 46 conduct. Thus, output pulses 212 are developed in the output from the trigger circuit 40 and output pulses 214 are in the output of the trigger circuit 42. The output pulses 212 and 214 are square wave and are the same width as the distance A. It is also noted that the output pulses 212 and 214 occur in alternate half cycles because the trigger circuits respond only to negative going pulses. Similarly output pulses 216 in trigger circuit 44, and 218 in trigger circuit 46 are the same width as the distance noted at B. It should also be noticed that because of the phase shifting network the half cycles in trigger circuits 40 and 42 are 90° out of phase with the trigger circuits 44 and 46. The square wave output pulses 212 and 214 cause the transistors in the power bridge 18 to conduct in each successive half cycle thus providing pulses of current in the motor winding 14 which are denoted at 220, 90° out of phase with the pulses 220 are pulses 222 which occur in the motor winding 16 which is controlled by the power bridge 20. In the event that the motor 12 should be subjected to an increased load, thus slowing the motor down, the difference voltage from the amplifier 117 is increased which would simultaneously raise the bias level in trigger circuits 40 and 42 and increase the amplitude of the sine wave in trigger circuits 44 and 46 thus increasing the pulse widths thereby providing a greater average current to overcome the increased load. When the motor returned to its control speed, the tachometer generator would adjust itself to again decrease the pulses to their proper width.

With the square wave output pulses such as 40Y and 42Y, for example, applied on the transformer primary winding 77, similar pulses will occur in the secondary windings 78' and 78". The polarities of the windings 78' and 78" are designated in FIG. 2A for the period in which transistor 52 becomes non-conductive. The negative polarity at one end of winding 78' is transferred to transistor 22 base causing it to conduct and in a similar manner the negative polarity at one end of winding 78" is transferred to the base of transistor 23 causing it to conduct at the same time. Under these conditions a circuit path will be formed in the power bridge 18 from the positive potential wire 74, through transistor 22, through motor winding 14 in one direction, and through transistor 23 to the negative potential wire 72, thus producing a full negative-going square wave pulse 180° thereafter another output trigger pulse will cause the same action to occur in transformer 85 thereby causing conduction through transistors 21 and 24. When this occurs it will be noted that the current through the motor winding 14 flows in the opposite direction in going from positive to negative potential. Thus, these pulses alternate from negative to positive on each successive trigger pulse, therefore the voltage applied to the motor winding 14 is a full-wave voltage as shown in 14E of FIG. 3.

The same sequence of events occurs in the motor winding 16 except that it is in phase with the reference source voltage 10. This waveform 16E it will be noted is 90° out of phase with 14E as caused by the phase shifting network 66 since this section is 90° shifted, and consequently winding 16 also has a full-wave voltage, 16E, applied to it except that it is maintained in quadrature with the voltage for winding 14.

Assuming that the arm 114 is moved a greater distance from the center point 115 to increase the amplitude of the alternating current from the amplifier 117 to control the motor at a faster rate of speed, the trigger circuits 40 and 42 then have a bias level denoted at 224 and trigger circuits 44 and 46 having a sine wave the peak of which is denoted at 226. This increases the distance between the points of intersection in each half cycle so that trigger circuits 40 and 42 conduct during the time designated at C and trigger circuits 44 and 46 conduct during the time designated at D. Because the distances C and D are correspondingly longer than the distances A and B, the square wave output pulses denoted at 228 for trigger circuits 40 and 42 and denoted at 230 for trigger circuits 44 and 46 have increased in width. Thus the average current flowing through the windings 14 and 16 had increased proportionately because of the increased pulse widths 232 and 234 in motor windings 14 and 16 respectively.

When the motor is again controlled to stop, the bias level in trigger circuits 40 and 42 is lowered as denoted at 200' and the alternating current in trigger circuits 44 and 46 has decreased as denoted at 204' thus cutting off any output from the respective trigger circuits.

Assuming that the motor is to be controlled in the opposite direction at a slow rate of speed the arm 114 is moved from the center point of the resistor 115 in the opposite direction which reverses the phase of the alternating current from the amplifier 117 by 180°. This changes the phase of the variable alternating voltage so that it is 180° out of phase with the line voltage and lags the phase of the A.C. control voltage in trigger circuits 40 and 42 by 90° instead of leading by 90° as for the opposite direction of rotation. Because of the full wave voltage control rectifier 130, the variable bias level is not effected for trigger circuits 40 and 42, and these trigger circuits conduct during the times denoted at F. Because, the sine wave input to the trigger circuits 44 and 46 is reversed, the motor will reverse its direction of rotation, but the trigger circuits 44 and 46 will still only conduct during a length of time denoted at G which is equal to the time denoted at F. This produces square wave pulses such as 240 in trigger circuits 40 and 42 and square wave pulses 242 in trigger circuits 44 and 46 which are of equal width.

When the motor is controlled in this same direction to a faster rate of speed, the width of the pulses is increased in the same manner as hereinbefore recited as shown in the appropriate column of FIG. 3.

In the event that a source of alternating current is unavailable, this system works with equal effectiveness from a source of direct current by merely including a stable oscillator 300 as shown in FIG. 4 to provide the A.C. voltage to the four trigger circuits. This arrangement is also advantageous when it is desired to operate a motor of a frequency such as 400 cycles per second by using a stable oscillator such as 300 which is capable of delivering an alternating voltage of similar frequency and a phase shifting network for a similar frequency. Thus motors of varying frequencies may be used in the same control system by merely using the stable oscillating component such as 300 and an appropriate phase shifting network. It is obvious the generator 110 would also have to be designed for the proper frequency because only the amplitude of the output corresponds to its speed and the frequency is constant.

Figure 5:
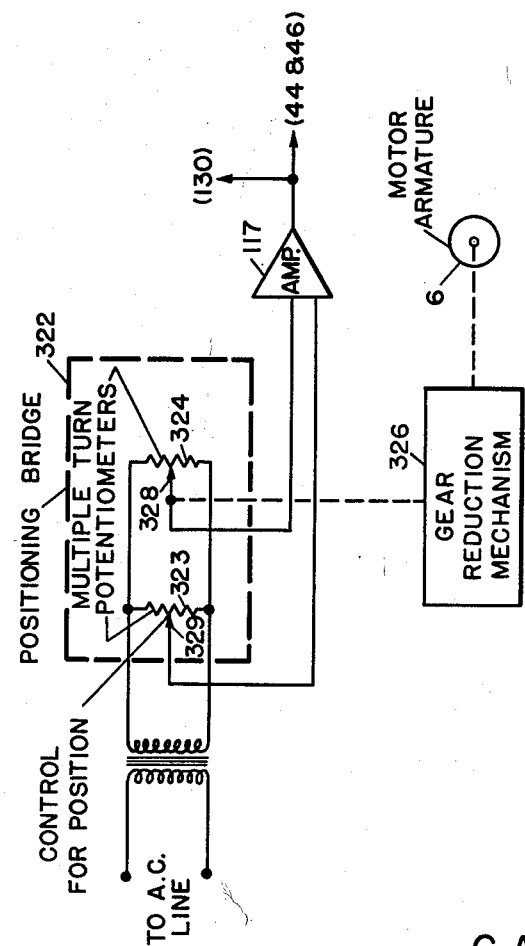
FIG. 5 is a fragmentary diagram of the circuitry and typical apparatus changes necessary for converting the system constructed according to this invention to operate as a motor positioning control system.

If it is desired to use this control system for controlling the angular position of a motor such as in follow up systems or other apparatus where the precise angular position of the motor is to be controlled, a positioning bridge 322 which includes a pair of multiple turn potentiometers 323 and 324 (FIG. 5) is substituted for the speed and direction control bridge in the embodiment shown in FIGS. 1 and 2A and 2B. A gear reduction mechanism 326 is substituted for the tachometer generator 110 which is so connected to arm 328 of the potentiometer 324 to produce an error signal which is amplified by the amplifier 117. The desired position of the motor is adjusted by arm 329 of the potentiometer 323, and when the arm 328 is out of correspondence with the arm 329 an error signal is produced, the amplitude of which varies with the degree by which the motor is out of correspondence. It is apparent that this error signal produces a variable sine wave voltage in trigger circuits 44 and 46 and a variable bias level in trigger circuits 40 and 42 similar to the first described embodiment.

Although the embodiment of the invention incorporating the stable oscillator 300 is shown in a system having the positioning bridge 322 it is contemplated that the stable oscillator 300 may be used in the embodiment incorporating the speed and direction control bridge 107 as well. It is also contemplated that the positioning bridge 322 may be used in a system that has a single phase source of alternating current as in the first described embodiment.

Having thus described several embodiments of the present invention, it is desired to be understood that these embodiments are selected to facilitate in the disclosure of the invention rather than to limit the number of forms which they may assume, and it is to be further understood that various modifications, adaptations and alterations may be applied to the specific forms shown to meet the requirements of practice, without in any manner departing from the spirit or scope of the present invention.

What I claim is:

1. A control system for a polyphase motor having at least two windings, said system comprising a first pulse forming means operative when activated to energize one winding of the motor with a first train of full wave voltage pulses of fixed amplitude, a second pulse forming means operative when activated to energize another winding of the motor with a second pulse train of full wave voltage pulses of fixed amplitude, the amplitude of said first train of voltage pulses being substantially equal to the amplitude of said second train, a first trigger circuit means having an input and an output, the output of said first trigger circuit means being connected electrically to said first pulse forming means, a second trigger circuit means having an input and an output, the output of said second trigger circuit means being connected electrically to said second pulse forming means, means for supplying an alternating voltage of one phase to the input of said first trigger circuit means, means for supplying an alternating voltage of another phase to the input of said second trigger circuit means, means for supplying a direct current voltage bias to both said first and second trigger circuit means, and control means operable to vary the amplitude of said direct current voltage bias of said first trigger circuit means and simultaneously to vary the alternating voltage to the input of said second trigger circuit means to activate said first and second pulse forming means simultaneously.

2. A control system for a polyphase motor having at least two windings, said system comprising a first pulse forming means to energize when activated one winding of the motor with a first train of full wave voltage pulses of fixed amplitude, a second pulse forming means to energize when activated another winding of the motor with a second train of full wave voltage pulses of fixed amplitude, a first trigger circuit means having an input and an output, a second trigger circuit means having an input and an output, the output of said first and second trigger circuit means being connected electrically to said first and second pulse forming means respectively, means for supplying an alternating voltage of one phase to the input of said first trigger circuit means, means for supplying an alternating voltage in predetermined phase relationship with said one phase to the input of said second trigger circuit means, means supplying a direct current voltage bias to said first and second trigger circuit means, both said first and second trigger circuit means being operable to provide at their outputs pulses of variable width depending upon the relative amplitude of the alternating voltage and direct current bias voltage applied thereto, and control means operable to vary the level of the direct current bias to said first trigger circuit means and to vary the amplitude of the alternating current to the input of said second trigger circuit means simultaneously to activate said first and second pulse forming means and control the width of the full wave voltage pulses in both said motor windings, thereby controlling the average current flowing through the windings of the motor.

3. A control system as claimed in claim 2 wherein each of said first and second pulse forming means is a power bridge having electric valve means operable to apply voltage pulses of the same polarity to opposite ends of a respective motor winding alternately during each half cycle period.

4. A control system as claimed in claim 2 wherein each said first and second trigger circuit means is operable when activated to produce at its output a square wave pulse of the same polarity during each half cycle period.

5. A control system as claimed in claim 2 wherein each said first and second trigger circuit means is a pair of astable multivibrators and wherein the input of each of said trigger circuit means is connected electrically to its alternating voltage supply to apply to one multivibrator a first alternating voltage that is in phase with its alternating voltage supply and to apply to the other multivibrator of its respective pair another alternating voltage that is 180° out of phase with its voltage supply, and wherein rectifying means are provided in the input of each said trigger circuit means to permit pulses of the same polarity to be applied to one multivibrator of each respective pair during alternate half cycles, whereby pulses of the same polarity are applied during successive half cycles to the output of each trigger circuit means, said output pulses being in phase with its supply voltage.

6. A control system as claimed in claim 5 wherein the alternating voltage at the input of each trigger circuit is a sine wave, and wherein said first and second trigger circuit means is operable to activate said respective first and second pulse forming means only when the peak amplitude of the alternating voltage in each multivibrator exceeds the bias level of the direct current bias voltage applied to its respective trigger circuit means.

7. A servo system for a polyphase motor having at least two windings, said system comprising a first pulse forming means operable when activated for energizing one motor winding with a train of full wave voltage pulses of fixed amplitude, a second pulse forming means operable when activated for energizing the other motor winding with full wave voltage pulses of fixed amplitude, a first trigger circuit means operatively connected electrically to said first pulse forming means, a second trigger circuit means operatively connected electrically to said second pulse forming means, means for supplying an alternating voltage to both said trigger circuit means in a predetermined phase relationship, means supplying a direct voltage bias to both said trigger circuit means, said trigger circuit means being operable to supply a voltage pulse during each half cycle period when the amplitude of the applied alternating voltage exceeds the direct voltage bias level to activate a respective pulse forming means, motor control means for adjustably determining the direct voltage bias level to said first trigger circuit means and simultaneously adjustably determining the amplitude and phase of the alternating voltage supply to said second trigger circuit means, a feedback voltage means for producing another alternating voltage, the amplitude of which corresponds to the speed of the motor and the phase of which corresponds to the direction of rotation of the motor, and means electrically connecting the feedback voltage to the alternating voltage supply to produce a difference voltage to control the amplitude of the alternating voltage supply to the second trigger circuit means, and means responsive to the amplitude of the difference voltage to control the bias voltage level in said first trigger circuit means.

8. A servo system for a two phase motor having two windings, said system comprising a first bridge circuit operable when activated during successive half cycle periods to produce a full wave of voltage pulses to a first winding of the motor, a second bridge circuit operable when activated during successive half cycle periods to produce a full wave of voltage pulses to a second winding of the motor, a first trigger circuit means electrically connected to said first bridge circuit, a second trigger circuit means electrically connected to said second bridge circuit, means for supplying a first alternating voltage of fixed amplitude and phase to said first trigger circuit means, means for applying a first direct voltage at a predetermined bias level to said first trigger circuit means, the level of said first bias being more negative than the peak amplitude of the negative going pulses of said first alternating voltage, means for applying a second direct voltage at a predetermined bias level to said second trigger circuit means, means for supplying a second alternating voltage to said second trigger circuit means 90° out of phase with the first alternating voltage, said first and second trigger circuit means being operable to activate its respective power bridge circuit with a respective train of full wave voltage pulses that correspond in phase respectively to the first and second alternating applied voltage, said periods of activation of the first and second bridge circuits being caused by the respective trigger circuit means only when the negative going alternating applied voltage pulses in a respective trigger circuit means exceeds the amplitude of the applied direct voltage bias during each half cycle, motor control means connected electrically to said second alternating voltage supply means for controlling the amplitude of said second alternating voltage to activate the second bridge circuit, rectifying means connected electrically between said motor control means and the first direct voltage bias applying means to control the amplitude of the first direct voltage bias level to activate said first bridge circuit, said motor control means being operable to control the level of the first direct voltage bias and the amplitude second alternating voltage to activate the first and second power bridge circuits with pulses of equal duration, feedback means operable to provide alternating feedback voltage, the amplitude of which corresponds to the speed of the motor, and means connecting the feedback voltage electrically to said motor control means to cause said feedback voltage to control the bias level in the first trigger circuit means and the amplitude of the alternating voltage in the second trigger circuit means according to the speed of the motor as compared to the speed as controlled by the motor control means.

9. A servo system as claimed in claim 8 wherein the motor control means is operably connected to the second alternating voltage supply means to reverse the phase of the secondary voltage applied to the second trigger circuit means by substantially 180° to control the motor in a reverse direction.

10. A servo system as claimed in claim 8 wherein the means for supplying the alternating voltage to both trigger circuit means is a single phase line source, and a 90° phase shifting network is electrically connected between said line source and one of said trigger circuit means.

11. A servo system as claimed in claim 8 wherein the means for supplying the first and second alternating voltages is a stable oscillator having its input operatively connected electrically to a direct current source.

12. A servo system as claimed in claim 8 wherein each said first and second trigger circuit means is a pair of emitter coupled astable multivibrators.

13. A servo system as claimed in claim 8 wherein the means for applying a direct current bias to said first trigger circuit means and the means for causing said power bridge circuits to produce voltage pulses of a fixed amplitude is supplied from the output of a power rectifier operatively connected to a source of single phase A.C. voltage.

14. A servo system for a two phase motor having two windings, said system comprising a first bridge circuit operable when activated during successive half cycle periods to produce a full wave of voltage pulses to a first winding of the motor, a second bridge circuit operable when activated during successive half cycle periods to produce a full wave of voltage pulses to a second winding of the motor, a first trigger circuit means electrically connected to said first bridge circuit, a second trigger circuit means electrically connected to said second bridge circuit, means for supplying a first alternating voltage of fixed amplitude and phase to said first trigger circuit means, means for applying a first direct voltage at a predetermined bias level to said first trigger circuit means, the level of said first bias being more negative than the peak amplitude of the negative going pulses of said first alternating voltage, means for applying a second direct voltage at a predetermined bias level to said second trigger circuit means, means for supplying a second alternating voltage to said second trigger circuit means 90° out of phase with the first alternating voltage, said first and second trigger circuit means being operable to activate its respective power bridge circuit with a respective train of full wave voltage pulses that correspond in phase respectively to the first and second alternating applied voltage, said periods of activation of the first and second bridge circuits being caused by the respective trigger circuit means only when the negative going alternating applied voltage pulses in the respective trigger circuit means exceeds the amplitude of the applied direct voltage bias during each half cycle, motor control means connected electrically to said second alternating voltage supply means for controlling the amplitude of said second alternating voltage to activate the second bridge circuit, rectifying means connected electrically between said motor control means and the first direct voltage bias applying means to control the amplitude of the first direct voltage bias level to activate said first bridge circuit, said motor control means being operable to control the first direct voltage bias and the second alternating voltage to activate the first and second power bridge circuits with pulses of equal duration, motor positioning means operatively connected to said motor for providing an alternating feedback voltage the amplitude of which corresponds to the out of correspondence position of the shaft of the motor, said positioning means being operatively connected to said motor control means to control the bias level in the first trigger circuit means and the amplitude of the alternating voltage in the second trigger circuit means according to the angular position of the motor shaft as compared to the required position of the motor as governed by the motor control means.

15. In combination, a first and second bridge circuit, each including a transistor electrically connected by its emitter and collector terminals in each arm of the circuit, a motor winding electrically connected across opposite diagonals of each bridge circuit to the common emitter collector terminal of adjacent transistors, an emitter coupled type trigger circuit means electrically connected operatively to the transistors in opposite arms of each bridge circuit, and means effective to apply a control voltage to said trigger circuit means effective to cause the trigger circuit means to drive each said connected transistors from cut off to saturation in alternate half cycles to cause each said bridge circuit to generate an abrupt pulse across its respective motor winding in opposite directions for a predetermined period of time during each half cycle as governed by said control voltage.

16. A system for controlling a poly-phase motor having at least two windings, comprising an A.C. voltage source for each winding in the proper phase relation, a trigger circuit means connected to each phase source operative to produce an output during each half cycle when the amplitude of its A.C. voltage phase exceeds a particular voltage level, pulse forming means for each motor winding responsive to the output of a respective trigger circuit means operative to energize its motor winding during each half cycle with a pulse having a duration corresponding to the output of the trigger circuit means, means for varying the amplitude of the A.C. voltage in one trigger circuit means to vary the output time in each half cycle to one pulse forming means, means for varying said particular level in the other trigger circuit means to vary the output time in each half cycle to the other pulse forming means, said output times in each trigger circuit means being substantially equal to provide the same average current in the windings of the motor during operation at substantially all speeds.

17. A system according to claim 16 further including circuit means responsive to the speed of the motor to vary the amplitude of the A.C. voltage in the one trigger circuit means and simultaneously to vary said predetermined voltage level in the other trigger circuit means to operate the motor at substantially constant speed with varying loads, and means to change the phase of the A.C. voltage in said one trigger circuit means only to reverse the direction of rotation of the motor.

References Cited in the file of this patent
UNITED STATES PATENTS

| | | |
|---|---|---|
| 2,753,507 | Dodington | July 3, 1956 |
| 2,863,108 | Raffensperger | Dec. 2, 1958 |
| 2,881,377 | Apa et al. | Apr. 7, 1959 |
| 2,922,095 | Hesse et al. | Jan. 19, 1960 |
| 3,064,175 | Vergrez | Nov. 13, 1962 |